United States Patent [19]

Bruno et al.

[11] Patent Number: 4,815,711

[45] Date of Patent: Mar. 28, 1989

[54] HYDRAULIC LEVELING APPARATUS FOR RECREATIONAL VEHICLE & THE LIKE

[75] Inventors: Frank L. Bruno; Uwe H. Nordmann, both of Monument, Colo.

[73] Assignee: Ultimate Engineering, Ltd., Monument, Colo.

[21] Appl. No.: 80,349

[22] Filed: Jul. 31, 1987

[51] Int. Cl.⁴ .............................................. B66F 3/24
[52] U.S. Cl. ................................................... 254/423
[58] Field of Search ............... 254/423, 420, 418, 424, 254/425, 427

[56] References Cited

U.S. PATENT DOCUMENTS

| | | | |
|---|---|---|---|
| 2,837,312 | 6/1958 | Troche | 254/423 |
| 3,362,683 | 1/1968 | Hansen | 254/423 |
| 3,817,493 | 6/1974 | Hanser | 254/423 |
| 4,662,610 | 5/1987 | Cofer | 254/423 |
| 4,711,428 | 12/1987 | Carpenter | 254/423 |

FOREIGN PATENT DOCUMENTS 818610 10/1951 Fed. Rep. of Germany ...... 254/423

Primary Examiner—Robert C. Watson
Attorney, Agent, or Firm—Klaas & Law

[57] ABSTRACT

Apparatus for leveling a vehicle or the like comprising a power cylinder for selectively actuating the apparatus between a horizontal storage position and a vertical support position; mounting apparatus for fixedly mounting the power cylinder means on and beneath the vehicle; a piston operably associated with the power cylinder for upward and downward power driven movement relative thereto; and support apparatus pivotally connected to the piston for movement between a horizontal storage position and a vertical support position. The support apparatus includes a lowermost plate shoe for engaging the ground and a rigid leg extending upwardly from the shoe for connection to the piston rod. A pivot connection between the leg and the piston rod enables relative pivotal movement therebetween. An abutment on the lower end portion of the power cylinder engages a pair of laterally spaced curve cam surfaces fixedly located on an upper portion of the leg during the initial portion and the terminal portion of the movement of the piston rod for causing controlled pivotal movement of the support apparatus.

21 Claims, 2 Drawing Sheets

HYDRAULIC LEVELING APPARATUS FOR RECREATIONAL VEHICLE & THE LIKE

This invention relates to hydraulic leveling apparatus for a recreational vehicle or the like.

BACKGROUND AND SUMMARY OF INVENTION

The prior art shows many different forms of leveling systems and leveling apparatus for use with various kinds of vehicles such as automobiles, campers, cranes, recreational vehicles, trucks and trailers, and the like. One type of such apparatus is associated with extensible outrigger mechanism mounted on the vehicle. Another type of such apparatus is mounted beneath the vehicle. Each type of apparatus conventionally employs one or more hydraulic cylinder units which are operable to move a ground engaging support plate or she between a vertically downwardly extending support position and a horizontally extending storage position. In some systems, the hydraulic cylinder units are pivotally movable between a vertically downwardly extending position and a horizontally extending storage position by use of one horizontally mounted hydraulic cylinder unit connected to a second hydraulic cylinder unit. In other systems, the hydraulic cylinder units are fixedly mounted in a vertical attitude and the support plate shoe apparatus is pivotally displaceable relative to the hydraulic cylinder unit during movement of he piston rod of the hydraulic cylinder unit. Such prior art systems and apparatus are disclosed in U.S. patent of Thompson U.S. Pat. Nos. 3,843,154; Hansen 3,817,493, 4,061,309 and 4,165,861; Bolard 1,783,822; Hornagold 3,901,532, 3,990,714 and 4,071,147; Tucker 2,546,203; and McCollum 1,990,047.

This invention relates to the type of leveling system and apparatus wherein the hydraulic cylinder units are fixed in a vertical attitude beneath the vehicle and the support plate shoe is pivotally movable by and relative to the cylinder unit between a horizontal storage position and a vertical support position. The support plate shoe is pivotally mounted on the piston rod so as to be pivotally actuated between the storage position and the support position by movement of the piston rod relative to the cylinder and associated cam means which are integral with the support plate mechanism and the cylinder unit

BRIEF DESCRIPTION OF THE DRAWINGS

An illustrative and presently preferred embodiment of the invention in the accompanying drawings wherein.

DETAILED DESCRIPTION

Figure 1:
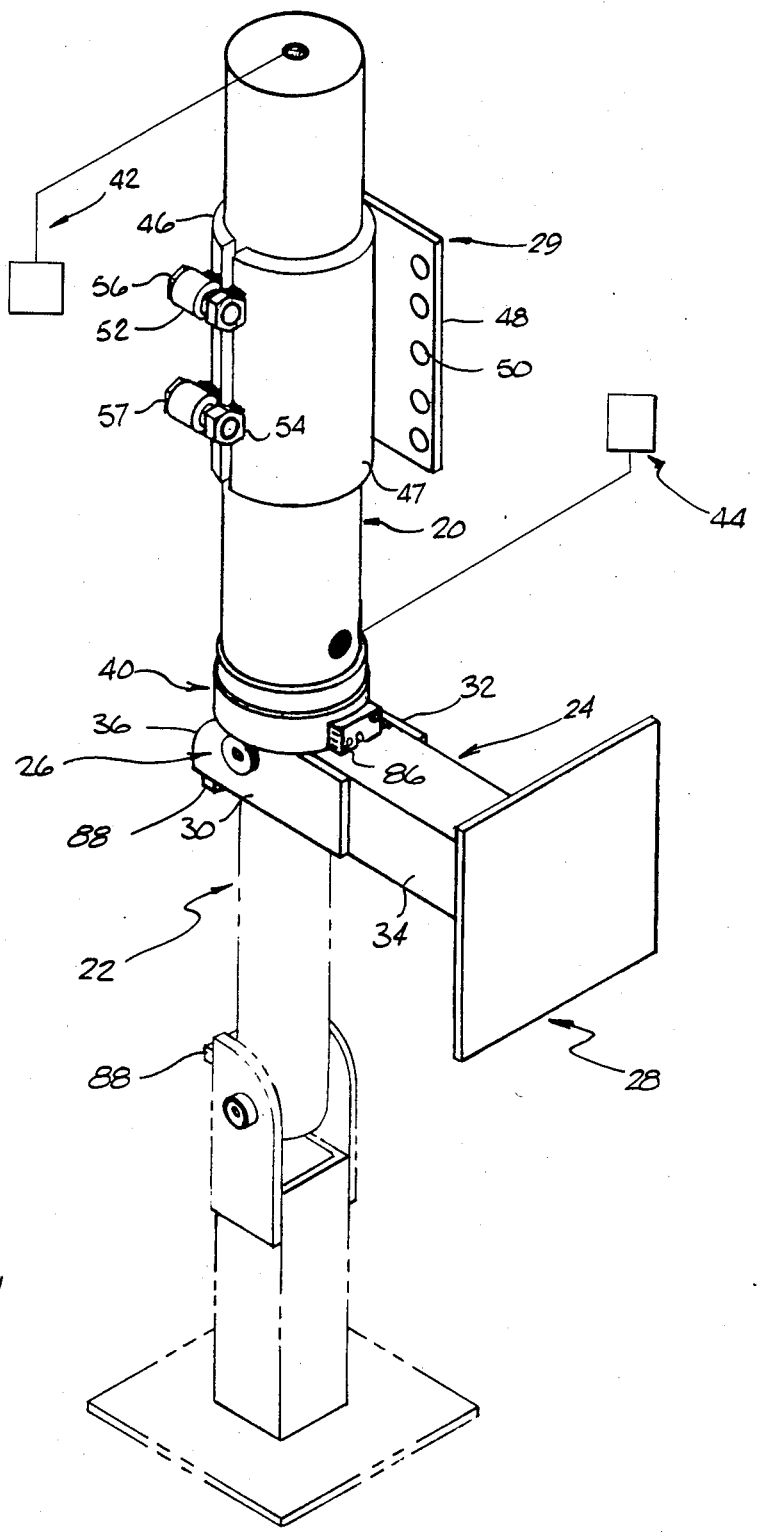
FIG. 1 is a perspective view of apparatus employing the present invention.
Figure 2:
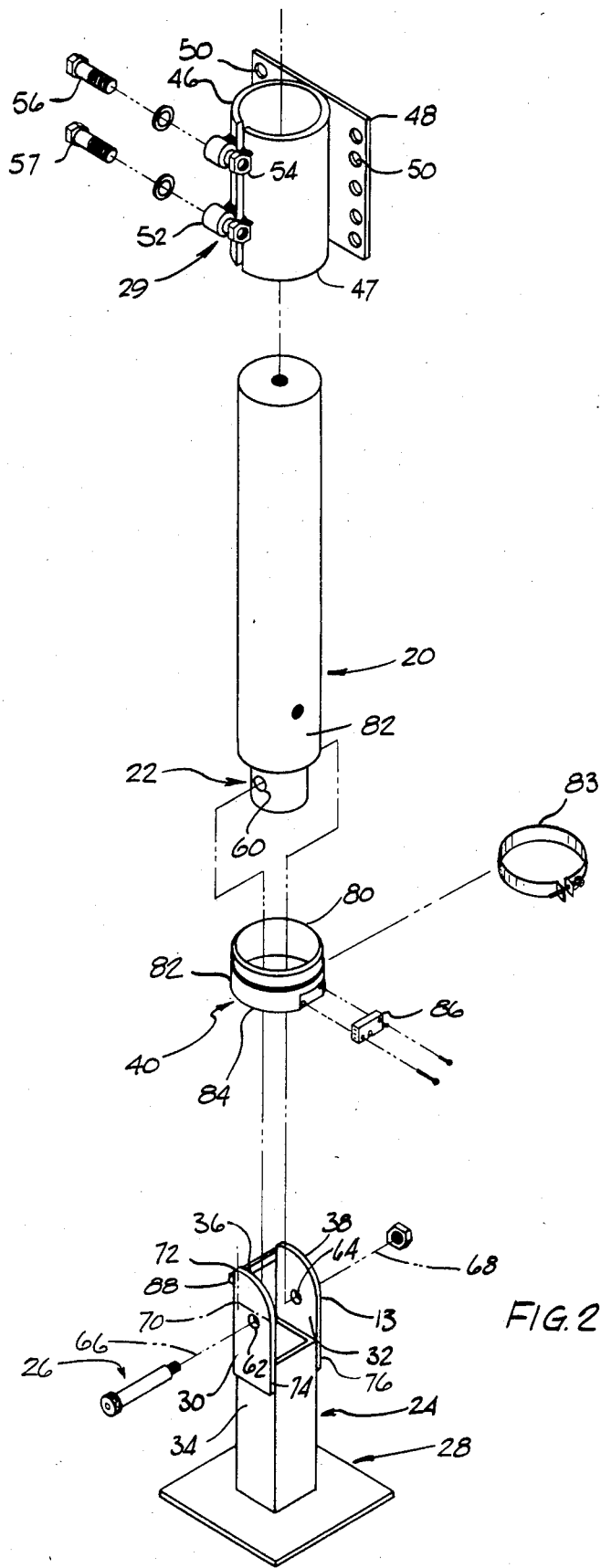
FIG. 2 is an explode perspective view of the apparatus of FIG. 1.

In general, the present invention comprises a hydraulic power cylinder means unit 20 of conventional design having a piston rod means 22 connected to a support leg means 24 by a pivot pin means 26 and having a support plate shoe means 28 mounted on the lower end of leg means 24. The cylinder unit is fixedly mounted to the vehicle by clamping means 29.

A pair of spaced parallel upwardly extending side plate members 30, 32 are fixedly mounted on a rigid support leg portion 34 of leg means 24. Each of the side plate members 30, 32 have an uppermost curved upper cam surface 36, 38 adapted to abut an annular wear pad cam means 40, mounted on the bottom end of cylinder unit 20, during upward movement of the piston rod means 22 whereby leg means 24 will be forced to swing upwardly to a stowed horizontal position due to rolling contact of the cam surfaces 36, 38 with the bottom surface of wear pad means 40.

The power cylinder unit 20 is connected to a source of hydraulic fluid under pressure through suitable passage and control means 42, 44. Suitable anti-rotation means (not shown) such as a spline or non-circular portions of the piston rod and bearing devices in the cylinder unit may be provided to prevent rotation of the piston rod relative to the cylinder unit. The cylinder clamping means 29 may comprise split sleeve portions 46, 47 fixedly mounted on a plate portion 48 having mounting bolt holes 50 for attachment to a portion of the vehicle such as the frame. Sleeve members 52 and nut members 54 are fixedly mounted on sleeve portions 46, 47 for receiving bolt members 56, 57. Sleeve portions 46, 47 provide a cylindrical passage having a diameter such as to enable vertical slidable adjustment of cylinder unit 20 to the correct position prior to tightening of the bolt members 56, 57 while also providing rigid clamping engagement along a substantial area of the cylindrical outer surface of the cylinder unit when the bolt members are tightened. When the cylinder unit has been properly fixedly mounted, the central longitudinal axis is located in a vertical attitude.

Piston rod means 22 has a cylindrical passage 60 on the lower end portion providing a transverse pivotal axis which intersects and is coplanar with the central vertical longitudinal axis of piston rod means 22. Side plate members 30, 32 have cylindrical passages 62, 64 with coaxial central axes 66, 68 which intersect and are coplanar with the central vertical longitudinal axis of leg means 24 which 10 is coaxial with the central vertical longitudinal axis of the piston rod. Curved surfaces 36, 38 have coaxial centers of curvature 70 which are axially upwardly and transversely outwardly offset from passage axes 66, 68. Each of the curved surfaces terminate upwardly in and are tangent with a short length flat surface 72 and terminate downwardly and are tangent with side plate surfaces 74, 76. Abutment ring means 70 has an upper portion 80 adapted to be slidably received by and fixedly supported on the lower portion 82 of cylinder unit 20 by any suitable means such as welding or a band type clamp 83 A lower portion 82 provides a flat annular abutment surface 84 which is transverse to the central longitudinal axes of the cylinder and piston and leg portion 24 and parallel with the pivotal axes. The outside diameter of the abutment surface 84 is such as to cause initial contact with the uppermost portions of curved surfaces 36, 38, inwardly of uppermost flat surfaces 72, during upward movement of the piston rod means whereby the leg means 24 are cammed upwardly as the curved surfaces roll across the abutment surface 84. A limit switch means 86 may be mounted on ring means 40 to provide a signal when the support means 24, 28 is in the horizontal storage position. An abutment means in the form of a cross base member 88 extends between the side plate members 30, 32 for engagement with a side surface of the piston rod means when the leg means is in a vertical attitude. The leg and support shoe means 24, 28 and side plate members 30, 32 may be made of metal parts or one piece of high strength plastic material. Abutment ring means 40 may also be made of metal or high strength plastic material.

In operation, the support leg and plate means may be moved from the raised horizontal storage position of FIG. 1 to the lowered vertical support position (shown in phantom) by selective actuation of hydraulic cylinder means 20 to cause downward movement of piston rod means 22. As piston rod means 22 moves downwardly, pivot pin means 26 is moved downwardly therewith and the support leg and plate means pivots downwardly due to the cantilever position and gravity at a rate controlled by the abutting engagement between curved surfaces 36, 38 and bottom surface 84 of abutment means 40. When the support leg and plate means reach a vertical attitude, abutment bar 88 engages the side surface of the piston rod means to prevent further outward pivotal movement in the direction of downward pivotal movement of the support means. The piston rod means and the support means are thereafter further downwardly extended into engagement with the ground and held in vehicle supporting position therewith at any desired level. In order to retract the support means, the cylinder means is reversely actuated to cause upward vertical movement of the piston rod means and the support means. When the uppermost portions of the curved surfaces 36, 38 engage the fixed flat bottom surface 84, the support means is caused to move pivotally upwardly about pivot means 26 until flat surfaces 74, 76 engage abutment surface 84 whereat limit switch means 86 is actuated to generate a stowed position signal.

It is to be noted that no separate additional actuating means, such as a second cylinder means or a return spring means, is required to achieve the desired movement. The cylinder means 20 is fixedly mounted in a vertical attitude and all movement of the support means is a result of only vertical up and down movement of the piston rod means. Thus, the apparatus requires a minimum number of parts and actuating mechanisms so as to reduce cost, maintenance, and likelihood of failure while providing for easy installation and a high degree of reliability in use. It is to be understood that a leveling system for any particular vehicle may include whatever number of units of the leveling apparatus as may be required and that the units may be controlled by any conventional control system.

The inventive concepts may be variously employed and the illustrative embodiments may be variously modified. It is intended that the appended claims be construed to cover alternative embodiments except insofar as limited by the prior art.

What is claimed is:

1. Apparatus for leveling a vehicle or the like comprising;
    power cylinder means for selectively actuating the apparatus between a horizontal storage position and a vertical support position;
    mounting means for fixedly mounting said power cylinder means on and beneath the vehicle;
    a piston means operably associated with said power cylinder means for upward and downward power driven movement relative thereto;
    support means pivotally connected to said piston means for movement between a horizontal storage position and vertical support position;
    said support means including a lowermost plate shoe means for engaging the ground and a rigid leg means extending upwardly from said shoe means for connection to said piston rod means;
    a pivot connecting mans between said leg means and said piston rod means for enabling relative pivotal movement therebetween;
    an abutment means on the lower end portion of said power cylinder means for engaging said leg means during an initial portion of the downward movement and a final portion of the upward movement of said piston rod means;
    a pair of laterally spaced curved cam surface means fixedly located on an upper portion of said leg means for abutting camming engagement with said abutment means on said power cylinder means during the initial portion and the terminal portion of the movement of said piston rod means for causing controlled pivotal movement of said support means;
    said piston rod means and said support means having coaxial central vertical longitudinal axes and said pivotal connecting means having a transverse pivotal axis coplanar with said longitudinal axes and said curved cam surface means have coaxial centers of curvature which are axially upwardly spaced from said pivot axis and laterally outwardly spaced from said longitudinal axes; and
    said abutment means comprising a ring member mounted on said power cylinder means and having an annular flat bottom abutment surface.

2. The invention as defined in claim 1 and wherein:
    said leg means comprising a box-like support leg portion and a pair of laterally spaced parallel side plate portions; and
    said curved can surface means being located on uppermost end portions of said side plate portions.

3. The invention as defined in claim 1 or 2 and wherein said mounting means comprising:
    an attachment plate portion for attachment to the vehicle; and
    a clamping portion for fixedly supporting said power cylinder means.

4. The invention as defined in claim 3 and wherein:
    said clamping portion having a central elongated passage for slidably receiving said power cylinder means; and
    bolt means for releasable clamping said power cylinder means in a plurality of positions.

5. The invention as defined in claim 1 or 2 and further comprising:
    limit switch means on said power cylinder means for engaging said support means in the storage position and generating a signal indicative of location of said support means in said storage position.

6. The invention as defined in claim 1 or 2 and wherein said curved cam surface means extending between flat uppermost horizontal surface portions and flat vertical side surface portions of said leg means.

7. Apparatus for leveling a vehicle or the like comprising:
    power cylinder means for selectively actuating the apparatus between a horizontal storage position and a vertical support position;
    mounting means for fixedly mounting said power cylinder means on and beneath the vehicle;
    a piston means operably associated with said power cylinder means for upward and downward power driven movement relative thereto;

support means pivotally connected to said piston means for movement between a horizontal storage position and a vertical support position;

said support means including a lowermost plate shoe means for engaging the ground and a rigid leg means extending upwardly from said shoe means for connection to said piston rod means;

a pivot connecting means between said leg means and said piston rod means for enabling relative pivotal movement therebetween;

an abutment means on the lower end portion of said power cylinder means for engaging said leg means during an initial portion of the downward movement and a final portion of the upward movement of said piston rod means;

a pair of laterally spaced curved cam surface means fixedly located on an upper portion of said leg means for abutting camming engagement with said abutment means on said power cylinder means during the initial portion and the terminal portion of the movement of said piston rod means for causing controlled pivotal movement of said support means;

said piston rod means and said support means having coaxial central vertical longitudinal axes and said pivotal connecting means having a transverse pivotal axis coplanar with said longitudinal axes and said curved cam surface means have coaxial centers of curvature which are axially upwardly spaced from said pivot axis and laterally outwardly spaced from said longitudinal axes;

said leg means comprising a box-like support leg portion and a pair of laterally spaced parallel side plate portions; and said curved cam surface means being located on uppermost end portions of said side plate portions.

8. The invention as defined in claim 7 and wherein said curved cam surface means extending between flat uppermost horizontal surface portions and flat vertical side surface portions of said leg means.

9. The invention as defined in claims 7 or 8 and wherein said mounting means comprising:
an attachment plate portion for attachment to the vehicle; and
a clamping portion for fixedly supporting said power cylinder means.

10. The invention as defined in claim 9 and wherein:
said clamping portion having a central elongated passage for slidably receiving said power cylinder means; and
bolt means for releasable clamping said power cylinder means in a plurality of positions.

11. The invention as defined in claims 7 or 8 and further comprising:
limit switch means on said power cylinder means for engaging said support means in the storage position and generating a signal indicative of location of said support means in said storage position.

12. The invention as defined in claim 11 and wherein:
said abutment means comprising a ring member mounted on said power cylinder means and having an annular flat bottom abutment surface.

13. Apparatus for leveling a vehicle or the like comprising:
power cylinder means for selectively actuating the apparatus between a horizontal storage position and a vertical support position;

mounting means for fixedly mounting said power cylinder means on and beneath the vehicle;

a piston means operably associated with said power cylinder means for upward and downward power driven movement relative thereto;

support means pivotally connected to said piston means for movement between a horizontal storage position and a vertical support position;

said support means including a lowermost plate shoe means for engaging the ground and a rigid leg means extending upwardly from said shoe means for connection to said piston rod means;

a pivot connecting means between leg means and said piston rod means for enabling relative pivotal movement therebetween;

an abutment means on the lower end portion of said power cylinder means for engaging said leg means during an initial portion of the downward movement and a final portion of the upward movement of said piston rod means;

a pair of laterally spaced curved cam surface means fixedly located on an upper portion of said leg means for abutting camming engagement with said abutment means on said power cylinder means during the initial portion and the terminal portion of the movement of said piston rod means for causing controlled pivotal movement of said support means;

said piston rod means and said support means having coaxial central vertical longitudinal axes and said pivotal connecting means having a transverse pivotal axis coplanar with said longitudinal axes and said curved can surface means have coaxial centers of curvature which are axially upwardly spaced from said pivot axis and laterally outwardly spaced from said longitudinal axes; and limit switch means on said power cylinder means for engaging said support means in the storage position and generating a signal indicative of location of said support means in said storage position.

14. The invention as defined in claim 13 and wherein:
said curved cam surface means extending between flat uppermost horizontal surface positions and flat vertical side surface positions of said leg means.

15. The invention as defined in claim 14 and wherein:
said abutment means comprising a ring member mounted on said power cylinder means and having an annular flat bottom abutment surface.

16. The invention as defined in claim 15 and wherein said mounting means comprising:
an attachment plate portion for attachment to the vehicle; and
a clamping portion for fixedly supporting said power cylinder means.

17. The invention as defined in claim 16 and wherein:
said clamping portion having a central elongated passage for slidably receiving said power cylinder means; and
bolt means for releasable clamping said power cylinder means in a plurality of positions.

18. Apparatus for leveling a vehicle or the like comprising:
power cylinder means for selectively actuating the apparatus between a horizontal storage position and a vertical support position;
mounting means for fixedly mounting said power cylinder means on and beneath the vehicle;

a piston means operably associated with said power cylinder means for upward and downward power driven movement relative thereto;

support means pivotally connected to said piston means for movement between a horizontal storage position and a vertical support position;

said support means including a lowermost plate shoe means for engaging the ground and a rigid leg means extending upwardly from said shoe means for connection to said piston rod means;

a pivot connecting means between said leg means and said piston rod means for enabling relative pivotal movement therebetween;

an abutment means on the lower end portion of said power cylinder means for engaging said leg means during an initial portion of the downward movement and a final portion of the upward movement of said rod means;

a pair of laterally spaced curved cam surface means fixedly located on an upper portion of said leg means for abutting camming engagement with said abutment means on said power cylinder means during the initial portion and the terminal portion of the movement of said piston rod means for causing controlled pivotal movement of said support means;

said piston rod means and said support means having coaxial central vertical longitudinal axes and said pivotal connecting means having a transverse pivotal axis coplanar with said longitudinal axes and said curved can surface means have coaxial centers of curvature which are axially upwardly spaced from said pivot axis and laterally outwardly spaced from said longitudinal axes; and wherein said curved cam surface means extending between flat uppermost horizontal surface portions and flat vertical side surface portions of said leg means.

19. The invention as defined in claim 18 and wherein:

said abutment means comprising a ring member mounted on said power cylinder means and having an annular flat bottom abutment surface;

said leg means comprising a box-like support leg portion and a pair of laterally spaced parallel side plate portions;

said curved cam surface means being located on uppermost end portions of said side plate portions; and said mounting means comprising an attachment plate portion for attachment to the vehicle; and a clamping portion for fixedly supporting said power cylinder means.

20. The invention as defined in claim 19 and wherein:

said clamping portion having a central elongated passage for slidably receiving said power cylinder means; and bolt means for releasable clamping said power cylinder means in a plurality of positions.

21. The invention as defined in claims 19 or 20 and further comprising:

limit switch means on said power cylinder means for engaging said support means in the storage position and generating a signal indicative of location of said support means in said storage position.

* * * * *